R. J. PERRY.
Spring Fish-Hooks.

No. 157,480.

Patented Dec. 8, 1874.

WITNESSES:
Edwin J. McLain,
D. R. Cowl

INVENTOR:
Robert J. Perry,
per Richards & Hale,
Attorneys.

THE GRAPHIC CO. PHOTO-LITH. 39 & 41 PARK PLACE, N.Y.

UNITED STATES PATENT OFFICE.

ROBERT J. PERRY, OF STEUBEN, NEW YORK.

IMPROVEMENT IN SPRING FISH-HOOKS.

Specification forming part of Letters Patent No. 157,480, dated December 8, 1874; application filed September 30, 1874.

*To all whom it may concern:*

Be it known that I, ROBERT J. PERRY, of Steuben, in the county of Oneida and State of New York, have invented certain new and useful Improvements in Spring Fish-Hooks; and I do hereby declare that the following is a full, clear, and exact description thereof, which will enable others skilled in the art to which it pertains to make and use the same, reference being had to the accompanying drawings and to the letters of reference marked thereon, which form a part of this specification.

My invention consists in a metallic spring formed in the shape of an inverted letter U, having its legs prolonged, and terminating in fish-hooks, which are arranged back to back, or curving outward, and a separate trigger-plate attached to the end of a line passing inward between the legs through a hole in the center of the curved part of the spring.

Figure 1:
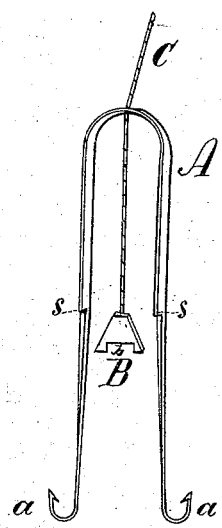
Figure 2:
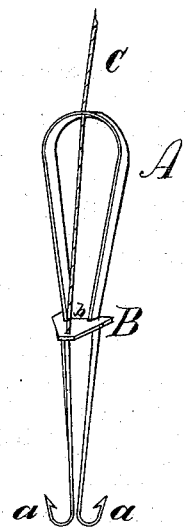

In the drawing, Figure 1 is a view of my invention. Fig. 2 is a view of my invention "set," or with the trigger-plate applied for holding the hooks in position, as when baited and ready to be taken by a fish.

A is the bent or inverted U-shaped spring, terminating in the hooks $a$ $a$, and having shoulders $s$ $s$ about midway its legs, owing to the upper part being wider than the immediate shanks of the hooks. B is the trigger-plate, the precise shape of which is not particularly important, though I prefer the form shown, viz., a triangle, with the apex blunted or cut off slightly, and a notch, $b$, cut in its base. The line C passes down through a hole in the center of the curved part of the spring, and its end is attached to the top of the trigger-plate, opposite the notch $b$.

In using my invention, the hooks are baited separately, and then pressed together, back to back, in which position they are confined by the trigger-plate, the notch of which is then placed over them, so as to embrace the shanks of both hooks, resting under and against the shoulders $s$ $s$.

It will be readily seen that a pull upon the hooks, such as will be given by a fish that has swallowed or caught them in his mouth, will cause them to slip downward on the line, and so dislodge the trigger-plate from its position. The hooks will then fly apart by the elasticity of the spring, and pierce both sides of the fish's mouth or throat, holding it more surely than does the ordinary single hook, besides more certainly taking a secure hold, owing to the stroke given by the spring.

When the trigger-plate is displaced from the shanks of the hooks, it is drawn between the legs of the spring, and prevents the same from slipping off the line.

Having now fully described and explained the operation of my invention, I claim and desire to secure by Letters Patent—

The combination of bent spring A, terminating in hooks $a$ $a$, and having shoulders $s$ $s$, with trigger-plate B and a line, C, all constructed and arranged to operate substantially as and for the purpose set forth.

In testimony that I claim the foregoing as my own invention I affix hereto my signature in presence of two witnesses.

ROBERT J. PERRY.

Witnesses:
ROBERT W. JONES,
JAMES IRVING.